Feb. 27, 1923.

H. BEHRNS

PUNCTUREPROOF TIRE

Filed June 29, 1922

Inventor

Harry Behrns

By

Attorney

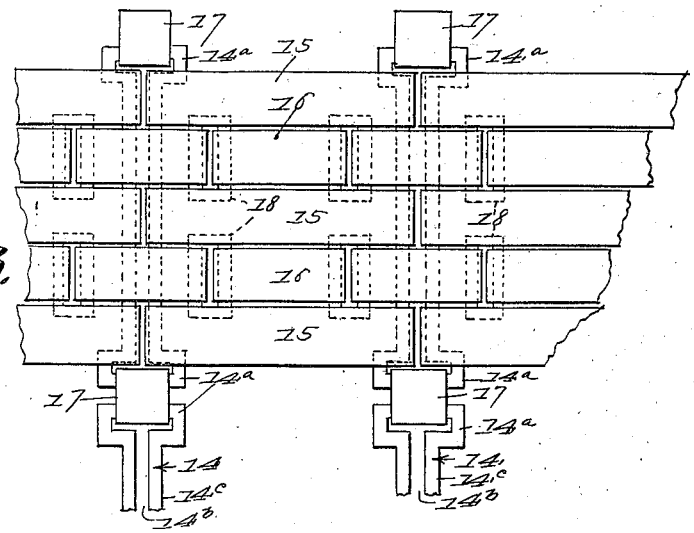
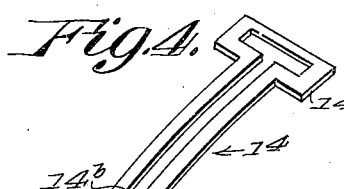
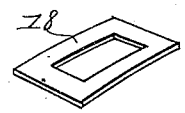
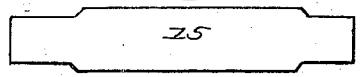
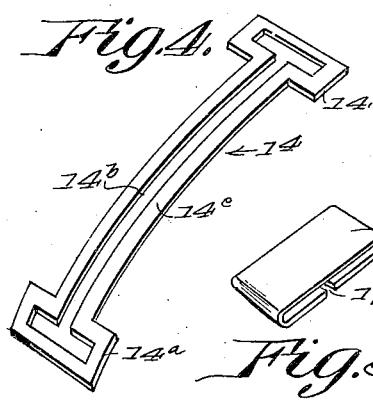
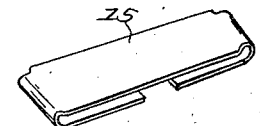
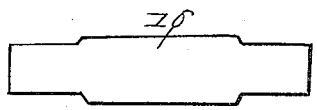
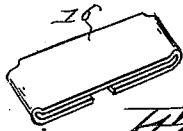

Patented Feb. 27, 1923.

1,447,009

UNITED STATES PATENT OFFICE.

HARRY BEHRNS, OF QUINTER, KANSAS.

PUNCTUREPROOF TIRE.

Application filed June 29, 1922. Serial No. 571,640.

*To all whom it may concern:*

Be it known that HARRY BEHRNS, a citizen of the United States of America, residing at Quinter, in the county of Gove and State of Kansas, has invented new and useful Improvements in Punctureproof Tires, of which the following is a specification.

The object of the invention is to provide a puncture proof or armored tire for the wheels of automobiles and similar vehicles as a means of guarding against blow-outs and protecting the inner tubes from puncture; and with this object in view the invention consists in a construction and combination of parts of which a preferred embodiment is shown in the accompanying drawings, wherein:—

Figure 3 is a detail plan view of a portion of the armor with the parts assembled to show the relations therebetween.

Figure 4 is a detail view of one of the anchor links.

Figure 5 is a view of one of the connecting links.

Figure 1:
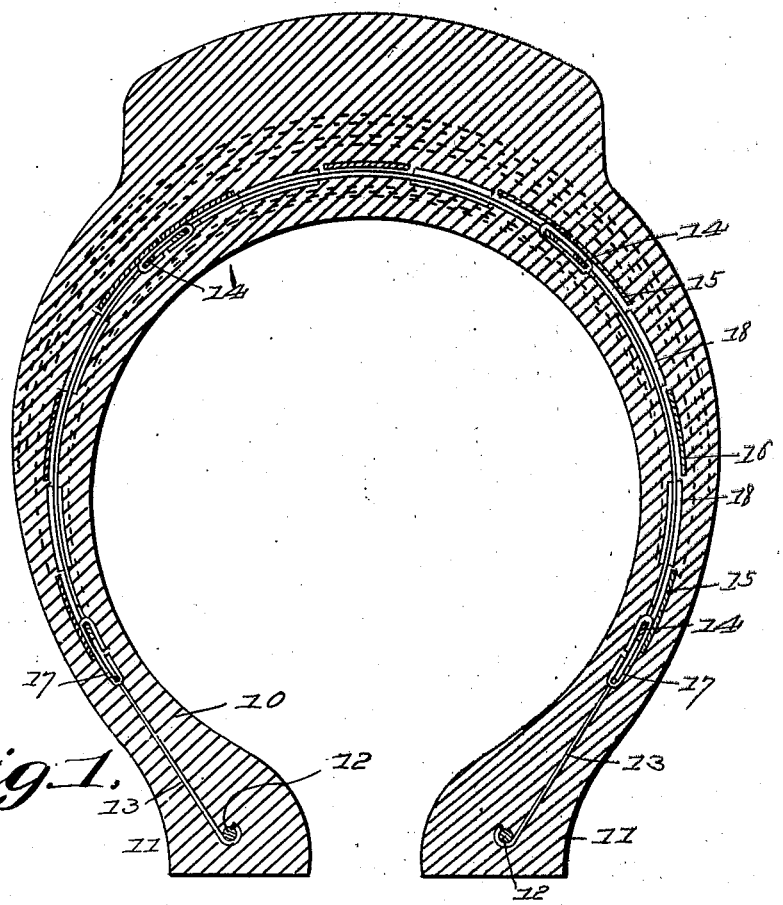
Figure 1 is a transverse sectional view of a tire constructed in accordance with the invention.
Figure 2:
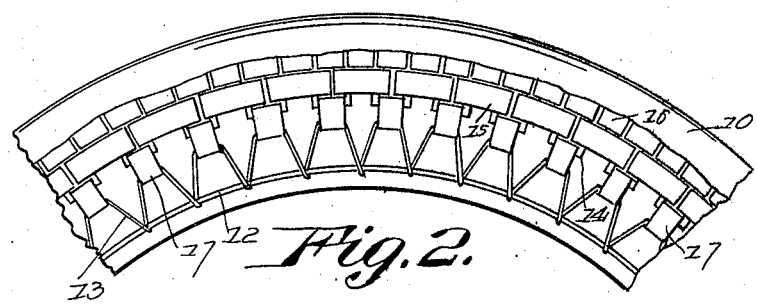
Figure 2 is a side view of a portion of the tire with the facing broken away to show the arrangement of the elements of the armor.

Figures 6 and 6ª are views respectively in blank and in operative form of one of the clips by which the intermediate protective plates are connected in series.

Figure 7 is a detail view of one of the clips by which the intermediate protective plates are connected in series.

Figures 8 and 9 are detail views respectively in blank and in operative form of one of the main protective plates.

The tire proper 10 which may be variously constructed and obviously may be of any preferred size or type, so far as the means for seating upon the rim may be concerned, is provided at its bead portions 11 with embedded anchor rods 12 which extend throughout the lengths of said beads, and connected with these anchor rods by a lacing 13 of pliable wire or the equivalent thereof is a continuous armor consisting essentially of spaced transverse series of anchor links 14 terminally supporting the elements of longitudinal series of main protective plates 15 between which are arranged continuous series of auxiliary or intermediate protective plates 16 of shorter lengths than the main plates and preferably so disposed as to break joint therewith as by extending continuously across the interval between the adjacent ends of adjoining main plates in the series parallel with and adjacent thereto.

The anchor links of which each series in the construction illustrated comprises three elements, one of which is arranged in spanning relation with the tread of the tire and the others at the sides thereof are provided with terminal transversely elongated eyes 14ª to provide for their connection in series transversely of the tire by connecting links 17, and the links which are disposed at the ends of each series of anchor links are connected with the anchor rods 12 by means of the lacing 13. The connecting links are of sheet metal folded or doubled upon itself to form terminal loops with the free ends of the blank disposed at about the middle of the length of the link as shown at 17ª and spaced apart sufficiently to permit of engagement with the eyes at the extremities of the anchor links and also to permit of the insertion of the lacing wire 13.

The anchor links are, in addition, longitudinally slotted as indicated at 14ᵇ to provide parallel side webs 14ᶜ for engagement by the doubled or looped extremities of the main protective plates 15, each of which is of a length sufficient to extend between adjacent anchor links, and each of which is terminally folded or looped as shown clearly in detail in Figure 9 to facilitate engagement with the anchor links and also afford a radial resilience to the tire,—the extremities of the blank forming the plate being spaced apart to facilitate the engagement thereof with the anchor links in the assembling of the elements of the armor.

The auxiliary or intermediate protective plates 16, shown in detail in Figure 6ª consist of blanks also terminally folded or looped for reasons explained in reference to the main protective plates and connected in series in break joint relation with the main protective plates, as above noted, by means of clips 18 shown in detail in Figure 7 and serving to permit of relative movement of the elements and hence flexibility of the assembled structure while affording a substantially unbroken protection against the penetration of objects liable to puncture the inner tube.

Having described the invention, what is claimed as new and useful is:—

1. An inflatable wheel tire having anchor rods embedded in the bead portion thereof and an armor consisting of a plurality of flexibly assembled elements embedded in the body of the tire and connected with said anchor rods by lacing extending therebetween, the said armor consisting of longitudinally spaced transverse series of flexibly connected anchor links terminally connected with the anchor rods and longitudinal series of protective plates terminally engaged with and spanning the intervals between the anchor links.

2. An inflatable wheel tire having anchor rods embedded in the bead portion thereof and an armor consisting of a plurality of flexibly assembled elements embedded in the body of the tire and connected with said anchor rods by lacing extending therebetween, the said armor consisting of longitudinally spaced transverse series of flexibly connected anchor links terminally connected with the anchor rods and longitudinal series of protective plates terminally engaged with and spanning the intervals between the anchor links, the adjacent extremities of the anchor links in each series being connected by connecting links each consisting of a folded blank forming terminal loops accessible between the spaced extremities of the blank.

3. An inflatable wheel tire having anchor rods embedded in the bead portion thereof and an armor consisting of a plurality of flexibly assembled elements embedded in the body of the tire and connected with said anchor rods by lacing extending therebetween, the said armor consisting of longitudinally spaced transverse series of flexibly connected anchor links terminally connected with the anchor rods and longitudinal series of protective plates terminally engaged with and spanning the intervals between the anchor links, said anchor links having terminal transversely engaged eyes, and the connections between the same consisting of connecting links comprising folded strips or blanks providing terminal loops for engagement with said eyes.

4. An inflatable wheel tire having anchor rods embedded in the bead portion thereof and an armor consisting of a plurality of flexibly assembled elements embedded in the body of the tire and connected with said anchor rods by lacing extending therebetween, said armor consisting of longitudinally spaced transversely disposed anchor links, transversely spaced longitudinal series of main protective plates terminally engaged with and spanning the intervals between said anchor links, and intermediate auxiliary longitudinal series of protective plates terminally connected by clips with which the extremities of said plates are engaged.

5. An inflatable wheel tire having anchor rods embedded in the bead portion thereof and an armor consisting of a plurality of flexibly assembled elements embedded in the body of the tire and connected with said anchor rods by lacing extending therebetween, said armor consisting of longitudinally spaced transversely disposed anchor links transversely spaced longitudinal series of main protective plates terminally engaged with and spanning the intervals between said anchor links, and intermediate auxiliary longitudinal series of protective plates terminally connected by clips with which the extremities of said plates are engaged, the elements of the series of auxiliary intermediate plates being arranged in break joint relation with the elements of the series of main protective links.

6. An inflatable wheel tire having anchor rods embedded in the bead portion thereof and an armor consisting of a plurality of flexibly assembled elements embedded in the body of the tire and connected with said anchor rods by lacing extending therebetween, said armor consisting of longitudinally spaced transversely disposed anchor links, transversely spaced longitudinal series of main protective plates terminally engaged with and spanning the intervals between said anchor links, and intermediate auxiliary longitudinal series of protective plates terminally connected by clips with which the extremities of said plates are engaged, the elements of the series of auxiliary intermediate plates being arranged in break joint relation with the elements of the series of main protective links and being of shorter lengths than the same.

In testimony whereof he affixes his signature.

HARRY BEHRNS.